A. E. KAMMRITZ.
OIL CAN.
APPLICATION FILED APR. 30, 1920.
1,378,239. Patented May 17, 1921.
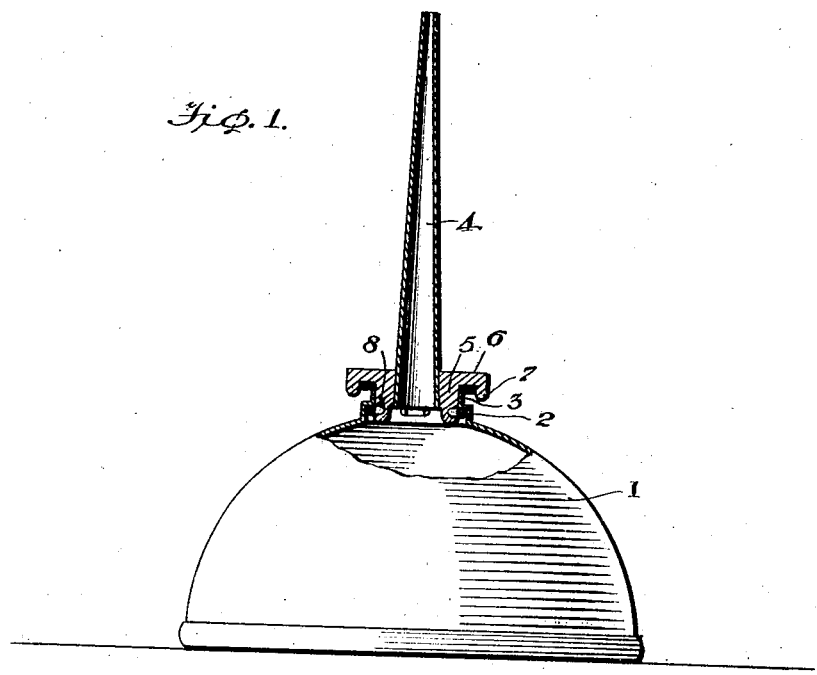
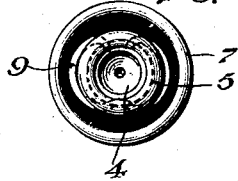
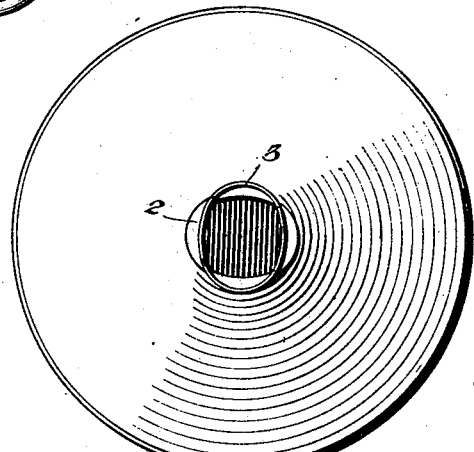
Witnesses
R. Rousseau
O. E. Trainor
Inventor
A. E. Kammritz,
By Munn & Co.
Attorney

UNITED STATES PATENT OFFICE.

ARTHUR E. KAMMRITZ, OF HARTFORD, CONNECTICUT.

OIL-CAN.

1,378,239. Specification of Letters Patent. Patented May 17, 1921.

Application filed April 30, 1920. Serial No. 377,831.

*To all whom it may concern:*

Be it known that I, ARTHUR E. KAMMRITZ, a citizen of the United States, and a resident of Hartford, in the county of Hartford and State of Connecticut, have invented certain new and useful Improvements in Oil-Cans, of which the following is a specification.

My invention is an improvement in oil cans, and has for its object to provide a device of the character specified, having new and improved means for detachably connecting the spout or nozzle with the body of the can, in such manner that it will be firmly locked to the body or can with a fluid tight joint, and wherein there will be no possibility of accidental dislodgment of the said spout or nozzle.

In the drawings,

Figure 1 is a front view of the improved can with a part in section,

Fig. 2 is a top plan view of the body of the can,

Fig. 3 is a bottom plan view of the spout or nozzle,

Fig. 4 is a plan view of the spring for connecting the spout or nozzle to the body.

In the present embodiment of the invention, the can comprises a body and a spout, the body 1 having at its top a nipple for engagement by the spout. This nipple consists of portions 2 and 3 which are elliptical in cross section and which have their long axes at right angles. The portion 2 is adjacent to the body, while the portion 3 is remote from the body, and they are formed by bending the material of the nipple into the proper shape.

Thus the opening of the nipple consists of two elliptical portions which have their long axes at right angles. The nozzle 4 which is of usual shape has connected with the large end thereof a head 5 circular and provided at its top with an outwardly extending flange 6 which has a depending marginal rib 7. The body of the head is adapted to fit within the nipple, and has a diameter corresponding to the short axes of the portions 2 and 3 of the nipple, the said short axes being the same.

This portion of the head is annularly grooved, as shown at 8 to receive the spring 9 shown in Fig. 4. The said spring which is composed of a wire of suitable gage is a split ring, having the ends bent inwardly as shown at 10 and having midway of the ends an inwardly bent portion 11. The annular groove 8 of the head has depressions for receiving the said bent-in portions 10 and 11, and for locking the spring in place on the head.

The spring 9 in its normal position is elliptical in outline and the long axis is at right angles to the line connecting the inwardly bent portion 11 of the spring with the split of the spring, and the long axis of the said spring is approximately the same length as the long axes of the portions 2 and 3.

It will be evident that when the nozzle is engaged with the body, the spring held in the groove of the head 5 may be first passed into the portion 3, and when compressed it may be forced into the portion 2. Now when the nozzle is turned the spring will expand in the portion 2 and will firmly lock the nozzle to the can body.

I claim:—

1. An oil can comprising a body and a nozzle, the body having a nipple composed of a plurality of elliptical portions having their long axes at right angles, a nozzle having a head circular in cross section and of a diameter corresponding to the length of the short axes of the said portions whereby to permit the head to enter either of the said portions, said head being annularly grooved, and a compression spring held within the groove and of elliptical form and shape to fit and fill either of the elliptical portions of the nozzle, said head having an outwardly extending flange provided with a marginal rib for holding a packing between the said rib and the body of the head for engagement by the end of the nipple.

2. An oil can comprising a body and a nozzle, the body having a nipple composed of a plurality of elliptical portions having their long axes at right angles, a nozzle having a head circular in cross section and of a diameter corresponding to the length of the short axes of the said portions whereby to permit the head to enter either of the said portions, said head being annularly grooved, and a compression spring held within the groove of elliptical form and shape to fit and fill either of the elliptical portions of the nozzle.

3. An oil can comprising a body and a nozzle, the body having a nipple composed of a plurality of elliptical portions having their long axes at right angles, a nozzle having a head circular in cross section and of a diameter corresponding to the length of the short axes of the said portions whereby to permit the head to enter either of the said portions, said head having compressible means for engaging with the portions to lock the nozzle to the head.

ARTHUR E. KAMMRITZ.